April 9, 1935. C. L. ELLIS Re. 19,521
BOARD MACHINE
Original Filed Oct. 16, 1930 2 Sheets-Sheet 1
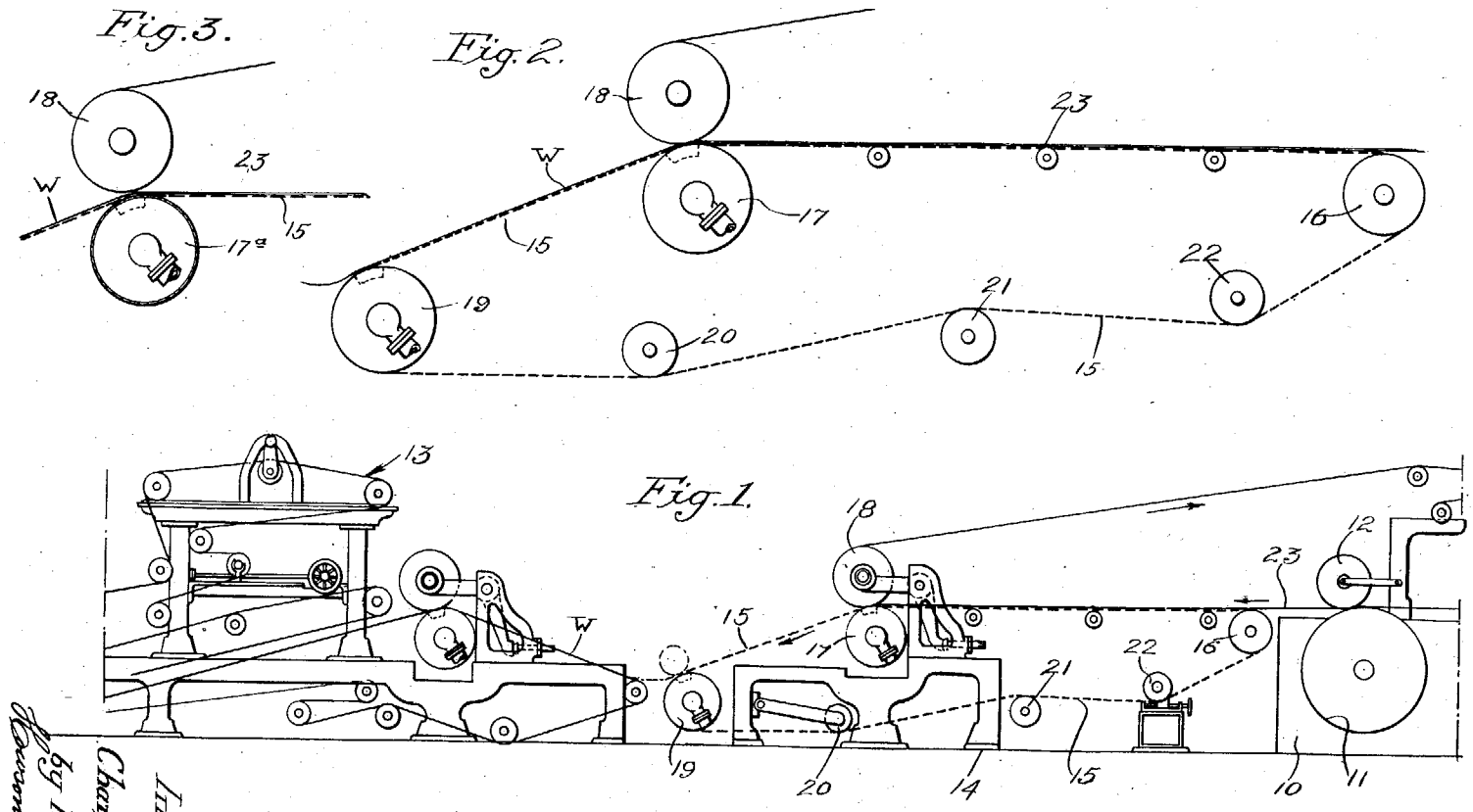
Inventor:—
Charles L. Ellis
by his Attorneys
Howson & Howson April 9, 1935. C. L. ELLIS Re. 19,521
BOARD MACHINE
Original Filed Oct. 16, 1930 2 Sheets-Sheet 2
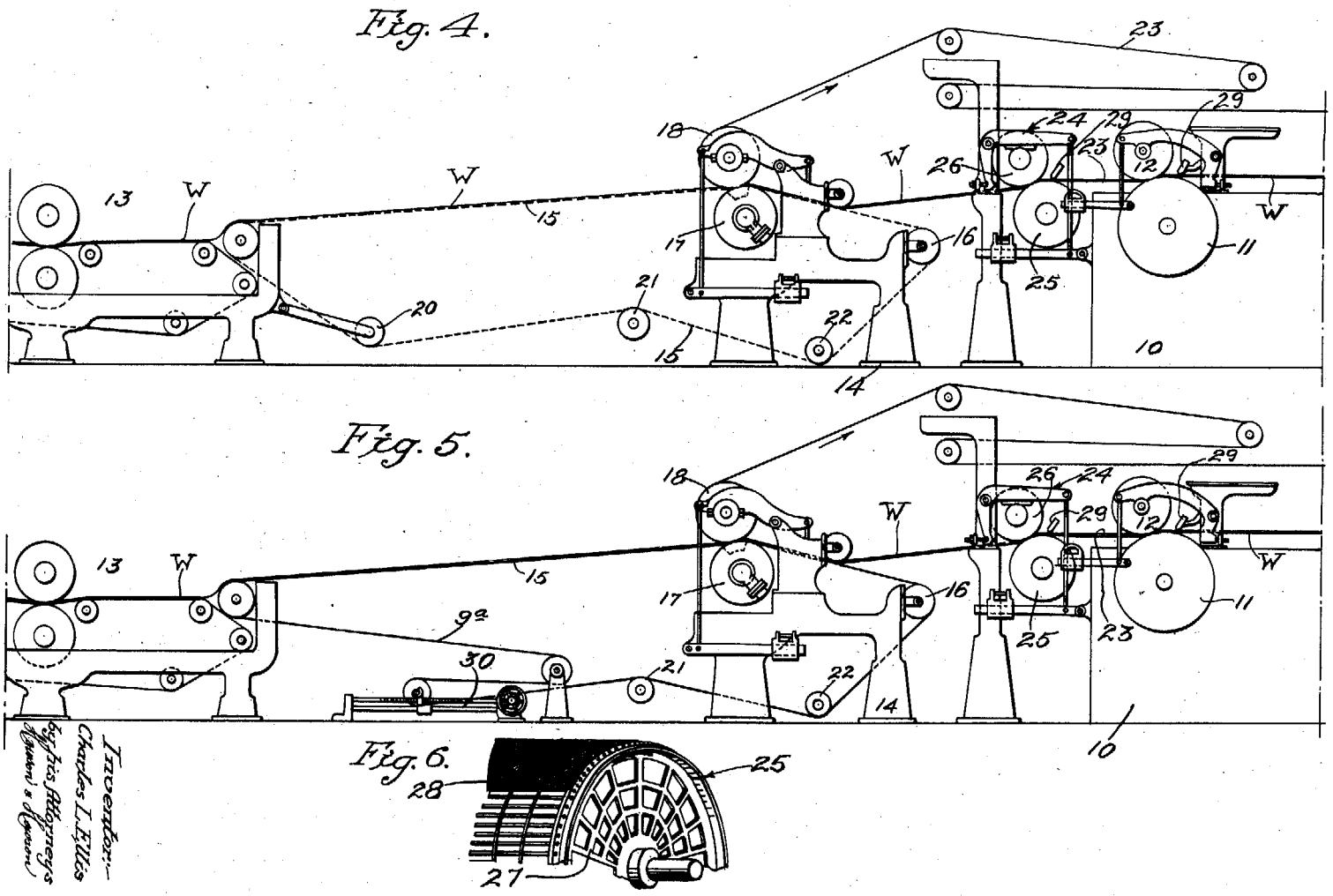
Inventor:—
Charles L. Ellis
by his Attorneys
Mason & Mason Reissued Apr. 9, 1935

Re. 19,521

UNITED STATES PATENT OFFICE 19,521

BOARD MACHINE

Charles L. Ellis, Bradford Hills, Pa., assignor to Downingtown Manufacturing Company, Downingtown, Pa., a corporation of Pennsylvania Original No. 1,879,143, dated September 27, 1932, Serial No. 489,215, October 16, 1930. Application for reissue March 9, 1933, Serial No. 660,191

40 Claims. (Cl. 92—42)

This invention relates to cylinder paper machines, and more particularly to an apparatus for transferring the formed paper web from the wet end of such machines to the press section of the machine.

An important object of the invention is to provide a structure delivering the paper web or sheet formed on the cylinder molds to the first press in a much drier condition than has heretofore been possible and to attain this result without the use of the usual primary press rolls.

A further object of the invention is the provision of a structure of this character eliminating the use of one of the usual long felts with its accompanying equipment of felt rolls, guide rolls, stretchers, whippers and the like, thereby reducing the power required in operation and eliminating the losses due to the deterioration of such felts.

A further and more specific object of the invention is the provision of a structure of this character wherein the paper web or sheet is delivered to an endless carrier preferably consisting of a wire by means of which it is transferred to the first press, the sheet while on the carrier being subjected to the action of a suction roll or rolls.

A further object of the invention is to provide in a construction of this character an arrangement such that the pick-up felt and web after leaving the last cylinder of the machine may be acted upon by an extractor press so that when the felt moves to deliver the web to the endless carrier such web is dried to an extent that any extensive press action is unnecessary before the web is delivered to the drier.

These and other objects I attain by the construction shown in the accompanying drawings wherein, for the purpose of illustration, I have shown a preferred embodiment of my invention and wherein:

Fig. 1 is a side elevation of a cylinder paper machine illustrating a portion of the cylinder and press parts thereof and the intermediate transfer mechanism;

Fig. 2 is an enlarged diagrammatic view of the transfer mechanism;

Fig. 3 is a fragmentary diagrammatic view showing a possible modification of the arrangement of Figs. 1 and 2;

Fig. 4 is a semi-diagrammatic view illustrating a modification of the arrangement of Fig. 1 to include the use of an extractor press;

Fig. 5 is a view similar to that of Fig. 4 illustrating the substitution of a felt for the wire as an endless carrier; and Fig. 6 is a fragmentary detail view showing the construction of the bottom roll of the extractor press.

Referring now more particularly to the drawings, and more particularly to Figs. 1 to 3 thereof, the numeral 10 indicates a cylinder vat which may constitute the solitary vat of the machine or the final of a series of such vats. This vat has arranged therein the usual cylinder mold 11 upon which operates a couch roll 12. In spaced relation to the vat 10 is disposed a final press section 13. Between the vat 10 and the final press section 13 I dispose a transfer mechanism generally designated at 14 including a wire 15 passing over an end wire roll 16 of any ordinary or usual construction, arranged adjacent the vat, through a suction press comprising a transfer suction roll 17 and an imposed top roll 18 therefor, over an end roll 19, preferably a suction roll, disposed adjacent the press 13 and then back to the end wire roll 16, this stretch of the wire having associated therewith the usual stretch roll 20 and wire guides 21 and 22 which may be of the type ordinarily employed in such location.

The pick-up felt 23 of the vat end of the machine passes over the wire from the end wire roll 16 to the suction press roll 17 from which point it is returned over the top press roll 18 to the vat end of the machine. The paper web or sheet W picked up by the cylinder mold is transferred to the felt 23 and passes with this felt over the wire to the suction press roll 17. By this roll it is transferred to the wire and from this point moves with the wire to the suction end roll 19 where it is again subjected to the action of suction and transferred to the press end of the machine. Instead of the usual suction roll, as illustrated in Figs. 1 and 2, a suction roll having a porous, resilient covering 17—*a* may be employed if so desired. This covering will tend to shield the wire from the rapid wear ordinarily resulting when the wire is passed directly over a suction roll.

Use of apparatus of this character in transferring the paper web W from the cylinder to the press end of the machine results in the production of a sheet free from felt marks which can be produced at a much higher speed and with much less pressing and expenditure of power than is ordinarily necessary. Furthermore, the losses due to shrinkage with a construction of this character are materially reduced.

The structure just described is that set forth in my prior application, Serial No. 462,561 for patent on Multi-cylinder board machine, which was filed June 20, 1930, and of which application this application is in part a continuation. In Fig. 4 I have illustrated a modification of the foregoing structure wherein, instead of depending upon the suction press, designated by the upper and lower rolls 17 and 18, for the removal of such a quantity of water as it will necessarily remove with the arrangement shown in these figures, I provide between the final cylinder mold and said suction press an extractor press 24 comprising a lower or extractor roll 25 and an associated upper press roll 26. This extractor press acts upon the felt 23 before it joins the endless carrier, the pulp web or sheet W coming in contact with the extractor roll 25. This roll is constructed somewhat similarly to a cylinder mold but is more strongly made in order that it may withstand the heavy pressures placed thereon, comprising a skeletonic cylindrical frame 27 and a wire cloth covering 28 therefor. At this time there is only associated with the paper web the felt 23 with the result that the extractor press removes considerable water from both the felt and the paper web, some of this water passing through the surface of the extractor roll 25 while the remainder thereof collects between the rolls 25 and 26 and is deflected by a sluice 29. The wire covering of the extractor roll, not having the same affinity for the paper web as the felt, does not remove the web from the felt but permits it to continue with the felt until it passes through the suction transfer press consisting of the rolls 17 and 18. The suction transfer press removes further water and serves to separate the paper web from the felt, which felt returns over the top of the cylinder mold or molds to again begin its pick-up travel while the web moves over the endless carrier to the final press 13. The extractor press 24 removes a very considerable amount of water from the paper, this amount generally being between one and one-half (1½) and two (2) tons per ton of paper finally produced by the machine. Due to the amount of water removed by the extractor press, a press felt may be substituted for the wire in a construction of this character if so desired, this arrangement being suggested in Fig. 5, the sole changes necessary to this arrangement being the provision of a take-up for the felt 9—*a* as suggested at 30. It will be noted that in each of the constructions the use of a long felt is eliminated with its associated mechanisms, thus materially reducing the actual cost of construction of the board machine and since the paper web produced may be delivered to the driers with a much smaller water content and at a much higher rate of speed than is possible with the ordinary machine, the efficiency of the entire organization is materially increased.

Since the structure hereinbefore set forth is but one of a number which might be adapted without departing from the spirit of my invention, I do not wish to be understood as limiting myself thereto except as hereinafter claimed.

I claim:

1. The combination with a cylinder board machine including the usual endless felt receiving the wet pulp from the cylinder mold, of an endless wire over which the felt passes and a pair of transfer press rolls between which the felt, the pulp and the wire pass, said transfer press rolls being so constructed and arranged that the pulp is transferred from the felt to the wire.

2. In a cylinder board machine having the usual endless pick-up felt and press end, means for transferring the pulp to the press end comprising an endless wire and a press including a suction roll acting through the wire for transferring the pulp from the felt to the endless wire.

3. In combination with a cylinder board machine comprising a wet end having the usual pick-up felt and the usual main press section, an endless wire receiving the pulp from said pick-up felt and transferring it directly to the main press section, and at least one suction roll associated with said endless wire to act upon the pulp through the wire during its passage thereover and to assist in the transfer of the pulp from said pick-up felt to the wire.

4. In combination with a cylinder board machine comprising a wet end having the usual pick-up felt and the usual main press section, an endless wire receiving the pulp from said pick-up felt and transferring it directly to the main press section, and a plurality of suction rolls associated with said wire to act upon the pulp through the wire during its passage thereover, one of said suction rolls assisting in the transfer of the pulp from the pick-up felt to the wire.

5. The combination with a cylinder paper machine including the usual endless felt for receiving the wet pulp from the cylinder mold, of an endless wire and a suction press through which the wire, the pulp and the felt pass with the wire contacting directly with the suction roll of said press, whereby the pulp is transferred to the endless wire, said suction roll having a porous resilient jacket.

6. The combination with a cylinder paper machine including the usual endless felt for receiving the wet pulp from the cylinder mold, of an endless wire over which the felt passes, a pair of transfer press rolls between which the felt, the pulp and the wire pass, whereby the pulp is transferred to the wire, and an extractor press between the rolls of which the felt passes prior to joining the wire.

7. The combination with a cylinder paper machine including the usual endless felt for receiving the wet pulp from the cylinder mold, of an endless wire, a press including a suction roll over which the wire, the pulp and the felt pass with the wire contacting directly with the suction roll, whereby the pulp is transferred to the endless wire, and an extractor press between the rolls of which the felt passes prior to joining the wire.

8. In combination with a cylinder paper machine and a wet end having the usual pick-up felt and the usual press section, an endless wire receiving the pulp from said pick-up felt and transferring it directly to the press end of the machine, at least one suction roll contacting directly with said endless wire to act upon the pulp during its passage thereover, and an extractor press between the rolls of which the felt passes prior to joining the wire.

9. In combination with a cylinder paper machine and a wet end having the usual pick-up felt and the usual press section, an endless wire receiving the pulp from said pickup felt and transferring it directly to the press end of the machine, at least one suction roll contacting directly with said endless wire to act upon the pulp during its passage thereover and to assist in the transfer of the pulp from said pick-up felt to the wire, and an extractor press between the rolls of which the felt passes prior to joining the wire.

10. In a paper machine, a pulp web-forming mechanism including a pick-up felt, a press section toward which the operative run of the felt moves, an extractor press through which the felt and its attached web pass immediately after completion of the pick-up run, an endless wire for transferring the web directly to the press section and means for transferring the web from said felt to the wire, including a suction roll with which the wire is in direct contact acting through the wire, the web, and the felt.

11. In a cylinder paper machine comprising a cylinder mold, a pick-up felt associated with said mold and collecting the paper web therefrom, and means for extracting water from the web comprising a suction press through which the felt and web pass, said suction press including a suction roll and a wire in direct engagement with the web through which the roll acts.

12. In a cylinder paper machine, a cylinder mold, an extractor press and a suction press and a single felt passing successively over said cylinder mold through said extractor press and through said suction press, each of said extractor press and suction press including a roll and a wire directly engaging the paper web accumulated by the felt in its passage over the cylinder mold through which the roll acts.

13. In the process of removing water from a fibrous web built up on the carrier felt in a cylinder type of paper making machine, the step which comprises contacting said web and carrier felt directly against a bare foraminous carrier, applying suction through the foraminous carrier and then delivering the web to a press.

14. The combination in a cylinder board machine including the usual endless felt receiving the wet pulp from the cylinder mold, of an endless wire over which the felt passes with the web in contact with the wire, and means for exerting suction on the felt and web through the wire.

15. The method of manufacturing paper comprising collecting a paper web upon a felt carrier and then successively subjecting the felt and web to pressure and suction while protecting the exposed surface of the web by a screen supporting means directly engaging the web.

16. The method of manufacturing paper comprising collecting a paper web upon a felt carrier and then subjecting the felt and web to pressure and suction while protecting the exposed surface of the web by a screen support directly engaging the web and through which the suction is exerted.

17. The method of manufacturing paper comprising collecting a paper web upon a felt carrier and then subjecting the felt and web to suction while protecting the exposed surface of the web by a screen support directly engaging the web and through which the suction is exerted.

18. Apparatus for making paper, comprising means for collecting pulp upon a screen surface, a felt engaging the pulp to remove it from said surface, a press acting upon the felt and pulp immediately following the removal of the pulp from said screen, said press including a screen surface directly engaging the pulp during the operation of the press to thereby prevent dislocation of the fibres during the pressing operation, a second felt joining the felt and pulp following said pressing operation and engaging the exposed surface of the pulp, and a suction roll acting upon the pulp through said second felt.

19. Apparatus for making paper, comprising means for collecting pulp upon a screen surface, a felt engaging the pulp to remove it from said surface, a press acting upon the felt and pulp immediately following the removal of the pulp from said screen, said press including a screen surface directly engaging the pulp during the operation of the press to thereby prevent dislocation of the fibres during the pressing operation, an endless carrier joining the felt and pulp following such pressing operation and engaging the exposed surface of the pulp, and a suction roll acting on the pulp through said endless carrier.

20. Apparatus for making paper, comprising means for collecting pulp upon a screen surface, a felt engaging the pulp to remove it from said surface, a press acting upon the felt and pulp immediately following the removal of the pulp from said screen, said press including a screen surface directly engaging the pulp during the operation of the press to thereby prevent dislocation of the fibres during the pressing operation, an endless carrier joining the felt and web following such pressing operation and engaging the exposed surface of the pulp, and a suction press through which the felt, the carrier and the pulp pass.

21. Apparatus for making paper, comprising means for collecting pulp upon a screen surface, a felt engaging the pulp to remove it from said surface, a press acting upon the felt and pulp immediately following the removal of the pulp from said screen, said press including a screen surface directly engaging the pulp during the operation of the press to thereby prevent dislocation of the fibres during the pressing operation, a second felt joining the felt and pulp following such pressing operation and engaging the exposed surface of the pulp, and a suction press acting on the pulp through said second felt.

22. In a cylinder paper machine, a forming section comprising a cylinder mold and a pick-up felt co-acting therewith to remove the pulp web from the cylinder mold, a suction press through which the pick-up felt passes while the web is still at the lower face of the felt, an endless carrier passing through said press and protecting the exposed face of the web, and means extracting water from the felt and web intermediate said cylinder mold and suction press, including a screen surface supporting and protecting the exposed face of the web.

23. In a cylinder paper machine, a forming section comprising a cylinder mold and a pick-up felt co-acting therewith to remove the pulp web from the cylinder mold, a suction roll acting upon the felt and web while the web is still at the lower face of the felt and from that face of the felt at which the web is disposed, an endless carrier passing between said suction roll and the web and protecting the exposed face of the web during the operation of the suction roll thereon, and means extracting water from the felt and web intermediate said cylinder mold and suction press including a screen surface supporting and protecting the exposed face of the web.

24. In a cylinder paper machine, a forming section, a press section, the forming section comprising a cylinder mold and a pick-up felt engaging the mold to remove a web therefrom while moving toward the press section, and an endless screen having its upper run moving toward and passing through a press of the press section with which the pick-up felt and web are joined while the web is at the under face of the pick-up felt.

25. In a cylinder paper machine, a forming section, a press section, the forming section comprising a cylinder mold and a pick-up felt engaging the mold to remove a web therefrom while moving toward the press section, and an endless carrier having its upper run moving toward and passing through a press of the press section with which the pick-up felt and web are joined while the web is at the under face of the pick-up felt, said press comprising a suction roll the pick-up felt likewise passing through said press.

26. In a cylinder paper machine, a forming section, a press section, the forming section comprising a cylinder mold and a pick-up felt engaging the mold to remove a web therefrom while moving toward the press section, and an endless felt having its upper run moving toward and passing through a press of the press section with which the pick-up felt and web are joined while the web is at the under face of the pick-up felt, said press comprising a suction roll acting on the web through the endless felt.

27. In a cylinder paper machine, a forming section, a press section, the forming section comprising a cylinder mold and a pick-up felt engaging the mold to remove a web therefrom while moving toward the press section, and an endless screen having its upper run moving toward and passing through a press of the press section with which the pick-up felt and web are joined while the web is at the under face of the pick-up felt, said press including a suction roll.

28. In a cylinder paper machine, a forming section, a press section, the forming section comprising a cylinder mold and a pick-up felt engaging the mold to remove a web therefrom while moving toward the press section, and an endless screen having its upper run moving toward and passing through a press of the press section with which the pick-up felt and web are joined while the web is at the under face of the pick-up felt, said press including a suction roll acting on the web through the endless screen.

29. The combination with a cylinder paper machine including the usual endless felt receiving the wet pulp from the cylinder mold, of an endless wire and a suction roll over which the wire, the pulp, and the felt pass, whereby water is removed from the pulp.

30. The combination with a cylinder paper machine including the usual endless felt receiving the wet pulp from the cylinder mold, of an endless wire over which the felt carrying the web passes and a pair of rolls between which the felt, the pulp and the wire pass with the pulp web being adjacent to the wire, for the purpose of de-watering the web.

31. The combination with a cylinder paper machine including the usual endless felt receiving the wet pulp from the cylinder molds, of an endless wire over which the web carrying felt passes and a pair of rolls between which the felt, the pulp and the wire pass with the pulp in contact with the wire; one of the rolls adjacent to the wire being a suction roll for the purpose of removing water from the web on the felt before being acted upon by the press section of the machine.

32. In a paper machine of the cylinder type, the combination of a fibrous web forming part, a pick up felt for receiving the fibrous web on the under side thereof, a foraminous carrier positioned after said forming part for receiving the fibrous web, means comprising a suction roll to transfer said fibrous web from said felt to the foraminous carrier and extracting means to remove water from said fibrous web without distorting and crushing the web.

33. In a cylinder type of paper machine including a plurality of web forming molds and a pick up felt for receiving and transferring the composite web so formed, a foraminous carrier for receiving the composite web directly from said pick up felt and a suction roll over which the carrier is trained for removing water from said composite web.

34. In a cylinder type of paper machine including cylinder molds and a pick up felt for collecting the fibrous web from the cylinder molds, a foraminous extractor roll positioned after the last cylinder mold for receiving the pick up felt and the fibrous web thereon to remove water therefrom, a Fourdrinier wire for supporting the fibrous web on the pick up felt and suction means to transfer the fibrous web from said felt to said wire while aiding in the removal of water from the fibers.

35. The method of making paper which comprises building up a composite web of fibrous material on a pick up felt, transferring said web by means of suction to a foraminous wire, extracting water from said web by means of suction applied through the wire and finally subjecting the web alone to heavy pressures to remove further quantities of water therefrom.

36. The method of making paper which comprises building up a composite web of fibrous material on a pick up felt, gently extracting water from the web while carried by said pick up felt, transferring said web by means of suction to a foraminous wire, extracting further quantities of water from said web by means of suction applied through the wire, and subjecting the web alone to heavy pressures to remove further quantities of water therefrom.

37. In the manufacture of paper on a cylinder type of paper machine, the step of gently extracting water from the wet web of paper while said web is supported on a foraminous carrier to dry the web sufficiently so that it is not crushed or distorted when subjected to heavy pressures in the process of finishing the sheet.

38. In a cylinder type of paper machine including a plurality of web forming molds and a pick up felt for receiving and transferring the composite web so formed, a foraminous carrier for receiving the composite web directly from said pick up felt and suction means for effecting the transfer from said pick up felt to said carrier, said suction means also aiding in the removal of water from said composite web.

39. A cylinder type of paper machine comprising a web-forming part including a pick-up felt, water extracting means positioned immediately after said web-forming part, foraminous carrier means to support the web, suction means for transferring the web to the carrier means, additional suction means to further dry the web while supported on a carrier means, and press roll and drying means positioned after said suction means.

40. In the process of making paper, the step of building a composite web of fibrous material on a pick-up felt, subjecting the pick-up felt and web thereon to a gentle water extraction treatment without the aid of suction, supporting the so treated web on a foraminous carrier belt and removing further quantities of water from the web by means of suction applied through said belt.

CHARLES L. ELLIS.